3,443,567
AUTOMATIC EGG FLAT WASHER
Howard L. Moore, 1801 Taylor,
Springdale, Ark. 72764
Filed Nov. 1, 1967, Ser. No. 679,693
Int. Cl. B08b 3/04, 13/00
U.S. Cl. 134—58        11 Claims

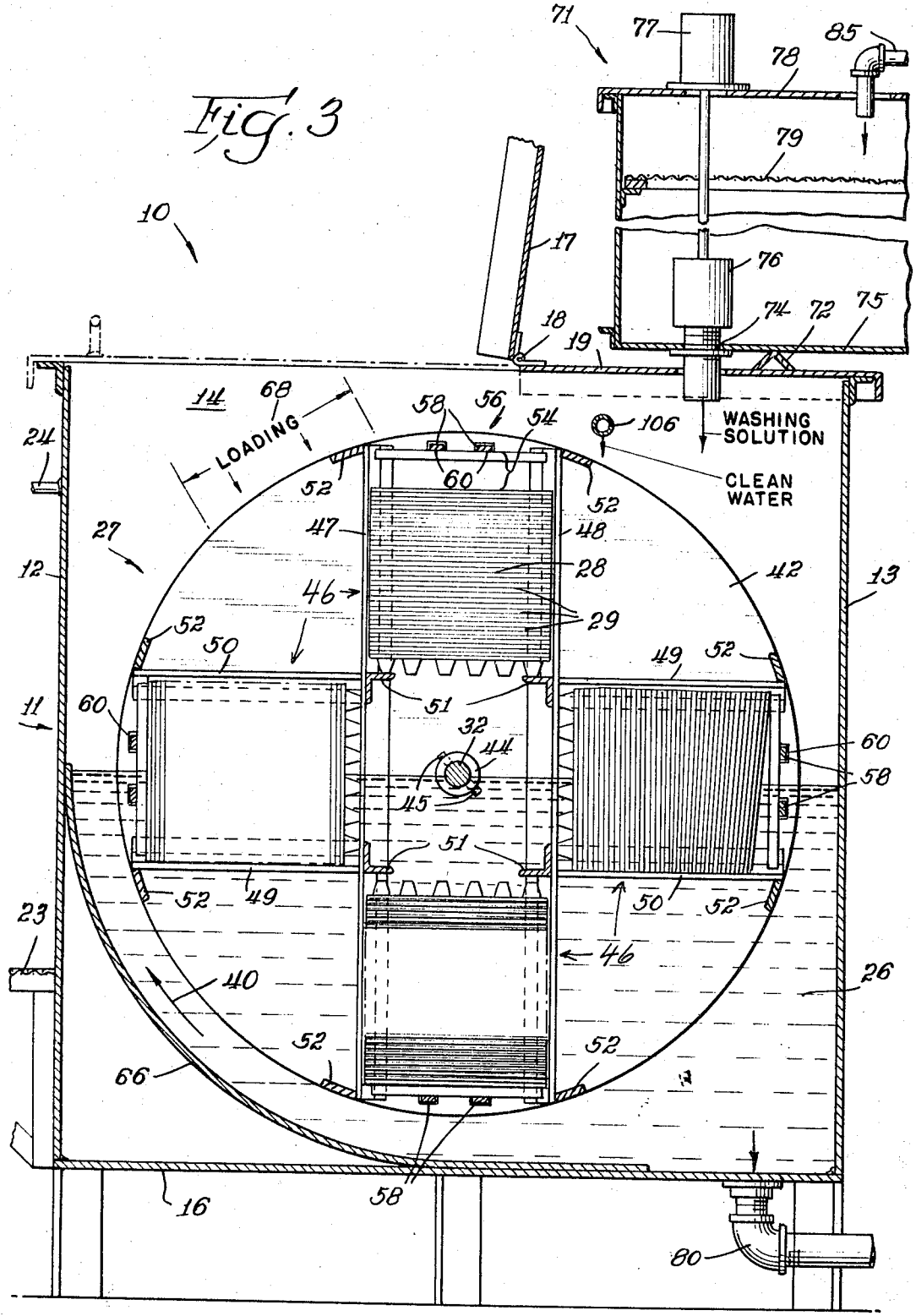

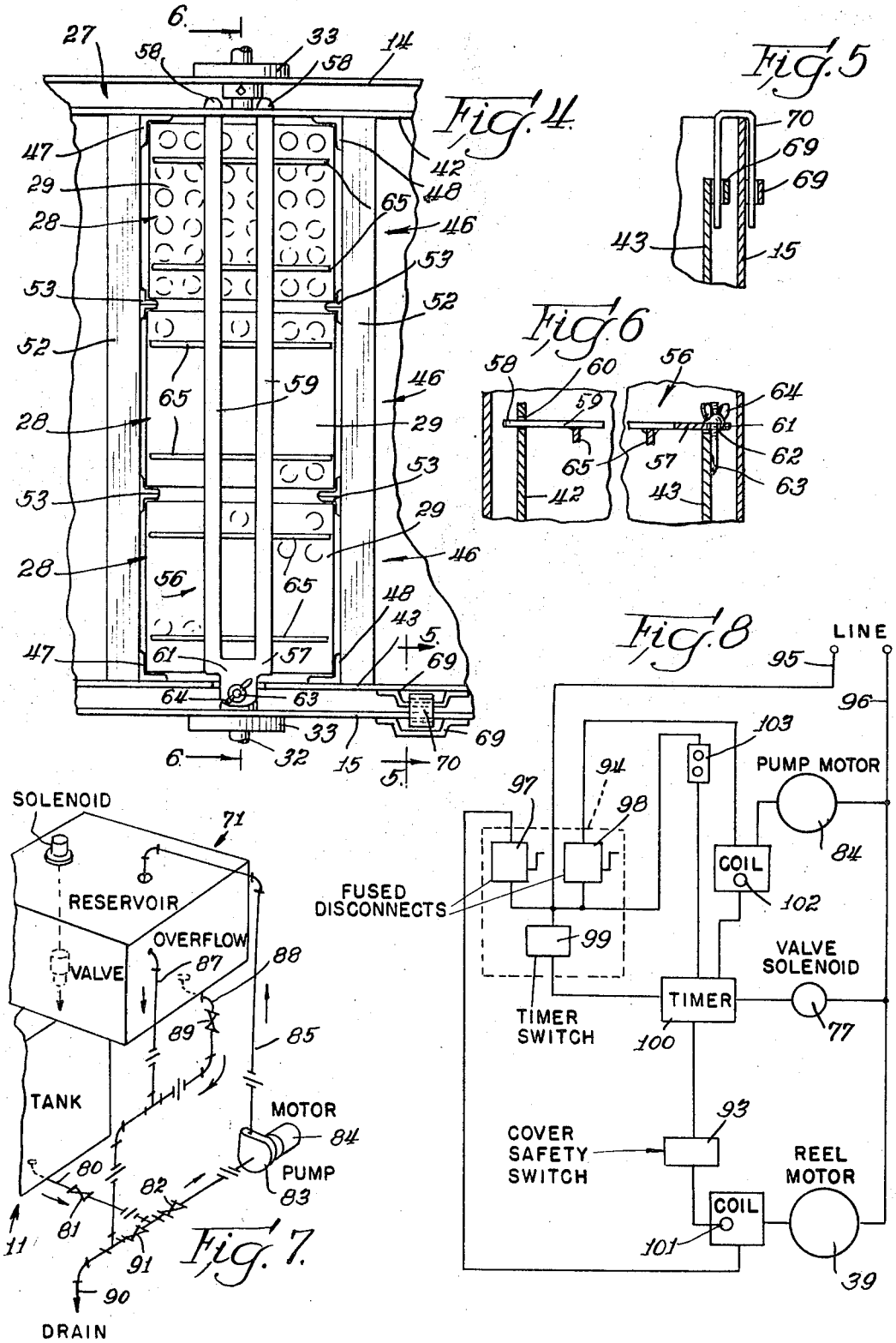

ABSTRACT OF THE DISCLOSURE

Stacks of egg flats are loosely mounted on a reel which is rotated through a washing solution for a predetermined time after which the solution is drained and the egg flats are dried by further rotation of the reel.

---

Heretofore eggs have been packaged in paper or paperboard material of various kinds. Such a material is capable of one time use ordinarily and of a limited number of times of reuse. Because of recently developed regulations in regard to sanitation, it has become uneconomical to employ egg flats of paper materials. As a result the industry has turned to flats formed of thermoplastic materials which can be cleaned and reused indefinitely.

Among the objects of this invention are: To provide for washing egg flats in a new and improved manner; to mount the egg flats loosely in stacks and to rotate the stacks through a washing solution generally flatwise to expose both sides of the egg flats to the solution; to direct the flow of the washing solution between the egg flats as they are rotated through it; to mount the stacks of egg flats on a reel in a tank containing the washing solution in such manner that they may have limited movement toward and away from the axis of rotation of the reel; to detachably mount on the reel the timing means for the stacks of egg flats; to lock the reel in the tank against rotation for stack loading purposes; to drive the reel by an electric motor; to provide a cover hinged to the tank to permit loading the stacks on the reel with a safety switch which is opened when the cover is open in order to prevent energization of the reel drive motor; to supply the washing solution from a reservoir above the tank on opening of a solenoid valve; to return the washing solution to the reservoir by an electric motor driven pump; to time the operation of the solenoid valve and the motors in order to energize the solenoid valve and reel motor, deenergize the solenoid and energize the pump motor after a predetermined time, and thereafter to deenergize both motors; and to provide for rinsing the egg flats after the washing opeartion has been completed.

According to this invention stacks of egg flats are loosely mounted on a reel that is arranged to be rotated in a tank through a washing solution in such manner that the egg flats in the stacks are separated in order to permit contact with the washing solution on both sides. Through the use of the revolving reel and a baffle on the bottom of the tank turbulence is created and by hydraulic action the washing solution is forced between the plastic flats. After completion of the washing cycle the solution is pumped through a filter into a reservoir. The rotation of the reel continues to drive the egg flats. If desired, after the washing cycle has been completed, the cleaned plastic egg flats are sprayed with clear water. In any event they are spun dry prior to removal. The operation is controlled sequentially by a timer to the end that, after the reel has been loaded with the several stacks of egg flats and the tank containing the reel has been filled to the proper level with the washing solution, the operation is substantially automatic.

Figure 1:
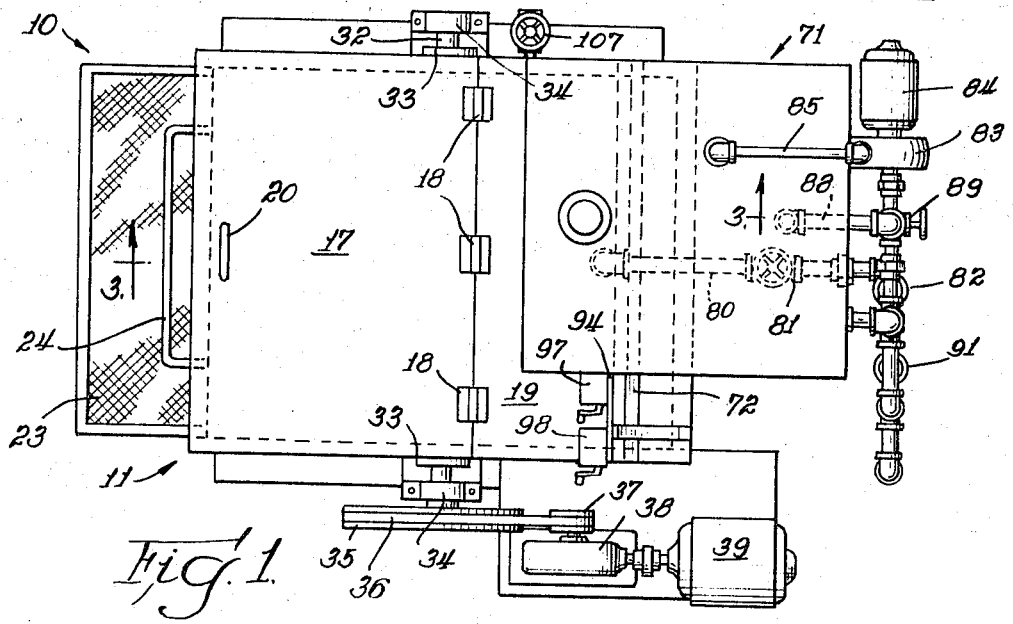
Figure 2:
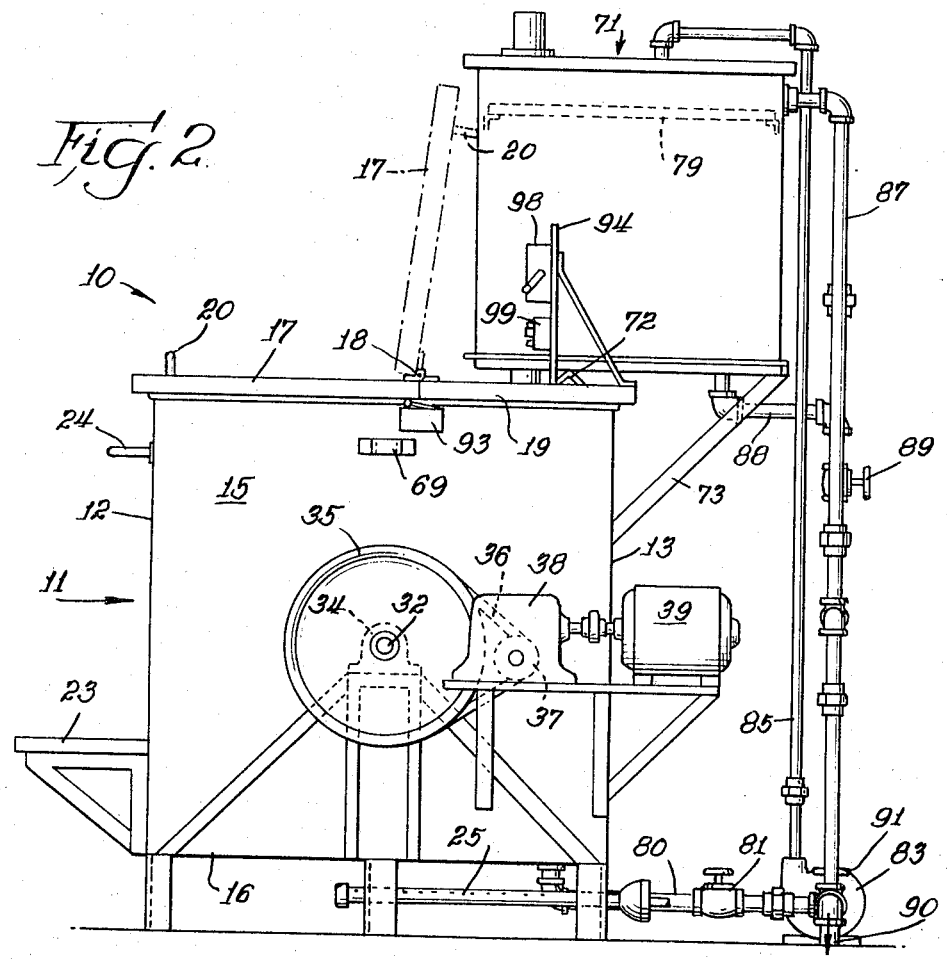

In the drawings: FIG. 1 is a top plan view of an egg flat washing machine in which this invention is embodied. FIG. 2 is a view, in side elevation, of the egg flat washing machine shown in FIG. 1. FIG. 3 is a vertical sectional view at an enlarged scale taken generally along the line 3—3 of FIG. 1. FIG. 4 is a top plan view at an enlarged scale of a portion of the reel shown in FIG. 3. FIG. 5 is a vertical sectional view taken generally along the line 5—5 of FIG. 4. FIG. 6 is a vertical sectional view taken generally along the line 6—6 of FIG. 4. FIG. 7 is a schematic diagram of the piping system for the egg flat washing machine. FIG. 8 shows diagrammatically the circuit connections that can be employed in practicing this invention.

In FIGS. 1, 2 and 3 the reference character 10 designates, generally, an egg flat washing machine which includes a tank 11 that is generally rectangular and may be formed of welded sheet steel with the sheets having a thickness of ¼". For illustrative purposes it is pointed out that the tank 10 may have a length of 4'6½", a width 3'8" and a height of 4'9". However, it will be understood that other dimensions and other materials can be employed for the tank 11. The tank 11 includes front and back walls 12 and 13, left and right side walls 14 and 15 and a bottom 16. A flanged cover 17 is hinged at 18 to a removable flanged cover section 19 which overlies the upper end of the tank 11. A handle 20, welded to the flanged cover 17, facilitates its movement to the broken line position shown in FIG. 2. Projecting outwardly from the lower portion of the front wall 12 is a platform 23 on which the operator can stand. A hand rail 24 is welded to the front wall 12.

Underneath the tank 11 there is a gas burner 25 that can be connected to a suitable gas supply. It is employed for applying heat to the bottom 16 of the tank 11 for the purpose of heating the washing solution 26, FIG. 3, that is located within the tank 11. The washing solution 26 can be clear water or water which contains a sanitizing chemical or other cleansing agent as may be desired.

Within the tank 11 there is rotatably mounted a reel that is indicated at 27. The reel 27 is arranged to carry radial stacks 28 of egg flats 29, each stack comprising 115 egg flats. The stacks 28 are positioned in groups of three radially around the reel 27, there being four groups or a total of twelve stacks 28. However, it will be understood that a larger or smaller number of stacks can be employed as desired.

The reel 27 includes a shaft 32 which projects through the left and right side walls 14 and 15 on which water seals 33 are mounted. Outboard bearings 34 serve to rotatably mount the shaft 32 near its ends outside of the side walls 14 and 15. Suitable supports are provided for the outboard bearings 34. At one end of the shaft 32 a pulley 35 is secured and it is driven by a belt 36 from a small diameter pulley 37 which is rotated through a gear reducer 38 by an electric reel motor 39. Preferably the arrangement is such that the reel motor 39 rotates the reel 27 in the direction of the arrow 40 in FIG. 3 at a speed of 60 r.p.m. The reel 27 includes circular end plates 42 and 43 that may be formed of ¼″ thick steel plate. Collars 44 are welded thereto for receiving the shaft 32. Set screws 45, FIG. 3, serve to hold the collars 44 and thereby the end plates 42 and 43 to the shaft 32 for rotation therewith.

The stacks 28 of egg flats 29 are positioned in radial egg flat receiving sections 46 which are located in a framework that extends between the end plates 42 and 43. This framework includes relatively long end angle members 47 and 48 which are secured, as by welding, to the circular end plates 42 and 43. Also relatively short end angle members 49 and 50 are secured to the circular end plates 42 and 43. It will be noted in FIG. 3 that the relatively short end angle members 49 and 50 extend from the relatively long angle members 47 and 48 to the margin of the circular end plate 42. A similar construction is used for the circular end plate 43. Bottom angle members 51 extend between the circular end plates 42 and 43 and are suitably welded or otherwise secured thereto. The angle members referred to herein are rolled steel sections. Also extending between the circular end plates are top strap members 52 of steel the ends of which are welded to the end plates 42 and 43. The individual egg flat receiving sections 46 are formed by intermediate T-shaped members 53 as shown more clearly in FIG. 4. These intermediate T-shaped members 53 are formed by placing rolled steel angle members back-to-back. Since the egg flats 29 are rectangular, the corners interfit with the angle members 47 and 48 or 49 and 50 and with the intermediate T-shaped members 53. The lowermost egg flat in each stack rests on the adjacent flanges of the bottom angle members 51 as seen in FIG. 3. Preferably the egg flats 29 are positioned in the stacks 28 such that there is a substantial space 54 between the outermost egg flat 29 and the underside of retaining means indicated generally at 56, FIG. 3. The reason for the provision of the space 54 is to permit the egg flats 29 to separate as they are rotated with the reel 27 through the washing solution 26 to permit both sides of each egg flat to be exposed to the washing solution and to have it flow thereover.

In FIGS. 4 and 6 the details of construction of the retaining means 56 are shown more clearly. It will be observed that the retaining means 56 includes a bifurcated member 57 the ends of the furcations 59 of which are arranged to extend through aligned openings 60 in the end plate 42. The other end 61 of the bifurcated member 57 extends through a slot in the other end plate 43 and is provided with an opening 62 for receiving therethrough a threaded stud 63 that is welded to the outside of the end plate 43. A wing nut 64 serves to hold the bifurcated member 57 in position. Transverse bars 65 welded to the undersides of the furcations 59 overlie the stacks 28 of egg flats 29. They are employed to prevent distortion of the egg flats when they are subjected to the centrifugal force incident to rotation of the reel 27.

With a view to forcing the washing solution 26 between the egg flats 29 as they rotate through their lowermost position in the tank 11 an arcuate wall or baffle 66 is provided as shown in FIG. 3. The ends of the arcuate wall or baffle 66 are suitably welded to the front wall 12 and bottom 16 of the tank 11.

In order to load the stacks 28 of egg flats 29 onto the reel 27, the flanged cover 17 is opened to the position shown by broken lines in FIG. 2 and full lines in FIG. 3. The reel 27 then is rotated to position one set of radial egg flat receiving sections 46 centrally of the opening that is provided when the cover 17 is raised. It is desirable to lock the reel 27 in this position. For this purpose, as shown in FIGS. 4 and 5, loops 69 of suitable metal are welded to the outside of the circular end plate 43 and to the outside of the right side wall 15. Four of the loops 69 are welded to the end plate 43 and a single loop 69 is welded to the right side wall 15. A U-shaped locking member 70 is arranged, as shown in FIG. 5, to enter aligned loops 69 with the bight overlying the upper edge of the right side wall 15. In this position the flanged cover 17 cannot be completely closed. After one set of radial egg flat receiving sections 46 has been filled, the locking member 70 is removed and the reel 27 is rotated manually to the next loading position and the operation then is repeated for the next set of radial egg flat receiving sections 46.

It is desirable to reuse the washing solution in the tank 11. For this purpose there is provided a reservoir that is indicated, generally, at 71 and it is located above the tank 11 as shown in FIGS. 1, 2 and 3 of the drawings. For illustrative purposes it is pointed out that the reservoir 71 can be formed of ⅛″ thick sheet steel to provide a reservoir having a width, length and height of 3′. However, other dimensions and materials can be employed as will be understood. The reservoir 71 is spaced from the cover section 19 by an angle 72 and it is supported by braces 73 from the back wall 13 of the tank 11. Any suitable support can be provided for the reservoir 71. An opening 74, FIG. 3, is provided in a bottom 75 of the reservoir 71 for receiving a valve 76 that is operated by a solenoid 77. The valve 76 is provided to permit the discharge of washing solution from the reservoir 71 into the tank 11 therebelow. The solenoid 77 is mounted on a cover 78 for the reservoir 71. Within the reservoir 71 and spaced somewhat from the underside of the cover 78 is a screen or filter 79. It is employed to remove certain solids from the washing solution 26.

The washing solution 26 is removed from the tank 11 through an exhaust or drain pipe 80, FIG. 3, and it flows through normally open valves 81 and 82, FIG. 7, to a pump 83 that is arranged to be driven by an electric pump motor 84. The washing solution is forced to flow by the pump 83 through a supply pipe 85 which opens into the reservoir 71 as shown in FIG. 3. In FIG. 7 it will be observed that an overflow pipe 87 is connected to the reservoir 71 near its upper end. Also a drain pipe 88 is connected to the bottom 75 of the reservoir 71 and through the normally closed valve 89 to a drain pipe 90 to which the overflow pipe 87 also is connected. A normally closed valve 91 can be opened for the purpose of independently draining the tank 11 through the drain pipe 90, if desired.

In order to prevent energization of the electric reel motor 39 when the cover 17 is open a safety switch 93 is mounted on the right side wall 15, FIG. 2, in the path of movement of the cover 17 to the fully closed position. It is only when the cover 17 is fully closed that the contacts of the safety switch 93 are closed to complete an energizing circuit for the reel motor 39 as will be apparent presently.

Suitably mounted on the cover section 19 is a control panel 94. It will be understood that the control panel 94 can be mounted at other locations as may be desired. The control panel 94 is shown in broken line outline in FIG. 8 and it is arranged to control certain functions of the system and to receive energy from supply conductors 95 and 96 which may be energized at 115 volts 60 Hz. Mounted on the control panel 94 are fused disconnect switches 97 and 98 which are manually operated and provided with fuses for overload protection. Also mounted on the control panel 94 is a timer switch 99. It is arranged to control the energization of a timer 100 which can be mounted at a convenient location for the purpose of controlling the energization of the reel motor 39, the solenoid 77 for the valve 76 and the pump motor 84. Preferably the timer 100 is of conventional construction which employs a synchronous motor for driving a timing drum or its equivalent to close and open circuits in predetermined sequence and at predetermined times. For controlling the operation of the reel motor 39 a contactor is employed that is arranged to connect it for energization across the supply conductors 95 and 96. The contactor is controlled in conventional manner by a coil 101 which can be energized through the cover safety switch 93 by the timer 100. In a similar manner the pump motor 84 is controlled by a contactor which is provided with a coil 102 that also is arranged to be energized by the timer 100. A push button control switch 103 is employed for initiating the operation of the timer 100.

In operation, the cover 17 is opened and the reel 27 is rotated from one loading position to the other until the four groups of three radial stacks are mounted on the reel and the retainer means 56 have been placed in proper retaining positions. Care is taken to provide the required space 54 so that the egg flats 29 are loosely mounted in each stack 28 and can be individually separated from each other as they move through the washing solution 26. Initially the washing solution 26 is supplied from an external source to the tank 11 with the reservoir 71 being empty. After removal of the U-shaped locking member 70 from the fourth loading position and closure of the cover 17, the switches 97 and 98 are closed, the timer switch 99 is operated together with switch 103 and the timer 100 begins to operate. Initially it energizes the reel motor 39 and the solenoid 77 to open the valve 76. Since the reservoir 71 is empty and the washing solution 26 is already in the tank 11, there is no flow through the valve 76 at this time. The reel motor 39 continues to rotate the reel 14 for a predetermined interval, for example for 45 minutes. As the reel 27 rotates in the direction of the arrow 40 in FIG. 3, the egg flats 29 are thrown radially outwardly by centrifugal action and, as they move downwardly, also they are moved outwardly by the force of gravity. They are most widely separated as they pass through the lowermost position where they are subject to the flow of the washing solution 26 therebetween due to the combined action of the rotation of the reel 27 and the arcuate wall or baffle 66. As the egg flats 29 continue to move upwardly from the lowermost position, while they are still subject to centrifugal action, the force of gravity acts in the opposite direction to bring them into mutual engagement at the uppermost position, particularly when the rotation of the reel 27 ceases.

At the end of the initial period referred to, the timer 100 then operates to close the valve solenoid 77 and to energize the coil 102 of the pump motor 84. The washing solution 26 then is withdrawn from the tank 11 and is pumped to the reservoir 71 where it is retained since the valve 76 is closed. The reel motor 39 continues to rotate the reel 27 so that, after the washing solution 26 has been withdrawn from the tank 11, the egg flats 27 are spun dry. Then they can be removed after the timer 100 has functioned to deenergize the coil 101 for the contactor of the reel motor 39 and the coil 102 of the contactor for the pump motor 84. The reel 27 then can be unloaded by reversing the steps used for loading it.

It may be desirable to provide for rinsing the egg flats 29 after the washing operation has been completed and the washing solution 26 has been withdrawn. For this purpose a transverse spray pipe 106, FIG. 3, is provided between the side walls 14 and 15 near the upper end of the tank 11. It is connected by a valve 107, FIG. 1, to a clear water supply. On suitable separate control for the reel motor 39, it can be caused to continue to rotate while the rinsing operation is being performed and, after it is completed by closure of valve 107, to continue to rotate to spin the egg flats 29 dry.

What is claimed as new is:

1. An egg flat washing machine comprising
a tank for containing a washing solution,
a reel in said tank,
means for loosely mounting one or more stacks of egg flats on said reel for individual bodily movement toward and away from the axis of rotation of said reel,
means for rotating said reel to cause said egg flats to separate and move generally flatwise through said washing solution; and
a reservoir for said washing solution mounted above said tank, a valve for controlling the flow of said washing solution from said reservoir into said tank, a solenoid arranged to open said valve, an electric motor arranged to drive said reel, switch means arranged to energize said solenoid and said electric motor, a pump arranged to return said washing solution from said tank to said reservoir, an electric motor arranged to drive said pump, and wherein said switch means is also arranged to deenergize said solenoid to close said valve and to energize said pump motor.

2. The egg flat washing machine according to claim 1 wherein said tank includes arcuate wall means in spaced relation to the periphery of said reel for directing the flow of said washing solution between the egg flats in said stacks as they are rotated therethrough.

3. The egg flat washing machine according to claim 2 wherein said tank is rectangular in cross section and said arcuate wall means is a baffle across a lower corner of said tank and is uniformly spaced from said periphery of said reel.

4. The egg flat washing machine according to claim 1 wherein said reel includes a plurality of radially extending egg flat receiving sections, and
means for retaining said egg flats is detachably mounted on said reel to overlie each egg flat receiving section.

5. The egg flat washing machine according to claim 4 wherein said reel includes a rotatable shaft extending exteriorly of said tank,
a circular end plate is secured to said shaft adjacent each of the ends thereof and said egg flat receiving sections are secured to said end plates, and
means detachably mount said retaining means on said end plates.

6. The egg flat washing machine according to claim 5 wherein each of said egg flat receiving sections includes a pair of spaced apart end angle members secured to the respective end plate, a pair of bottom angle members extending between said end plates, and pairs of intermediate T-shaped members upstanding from said bottom angle members and interconnected at their upper ends, and
said retaining means comprises a bifurcated member with the ends of the furcations extending through one of said end plates and the other end clamped to the other end plate.

7. The egg flat washing machine according to claim 1 wherein locking means are provided for holding said reel stationary in said tank to permit loading said stacks of egg flats on and removing the same from said mounting means therefor.

8. The egg flat washing machine according to claim 7 wherein said locking means includes loops secured to said reel and to a wall of said tank and a U-shaped locking member slidable into said loops and overlying an edge of said wall.

9. The egg flat washing machine according to claim 1 wherein a cover is hinged to said tank to permit loading and unloading of said reel,
a safety switch controlled by said cover prevents energization of said reel motor drive when said cover is open.

10. The egg flat washing machine according to claim 1 wherein said switch means includes timing means for deenergizing said solenoid and energizing said pump motor a predetermined time after energization of said solenoid and said reel motor and, after a further predetermined time, for deenergizing said reel motor and said pump motor.

11. The egg flat washing machine according to claim 1 wherein means are provided for rinsing said egg flats after they have been washed.

(References on following page)

References Cited

UNITED STATES PATENTS

| | | | |
|---|---|---|---|
| 404,141 | 5/1889 | Willcox | 134—159 |
| 566,471 | 8/1896 | Richards | 134—159 |
| 740,793 | 10/1903 | Barrick | 134—159 XR |
| 1,289,326 | 12/1918 | Walker et al. | 134—142 XR |
| 1,940,076 | 12/1933 | Cocks | 134—159 XR |
| 2,260,518 | 10/1941 | Hamilton et al. | 134—159 XR |
| 2,696,216 | 12/1954 | Meyer | 134—155 |
| 2,755,716 | 7/1956 | Epstein | 134—159 XR |
| 2,893,407 | 7/1959 | Babson | 134—58 XR |
| 3,034,519 | 5/1962 | Jacobs | 134—99 XR |
| 3,237,632 | 3/1966 | Silberzahn | 134—159 XR |

FOREIGN PATENTS

| | | |
|---|---|---|
| 437,997 | 12/1926 | Germany. |
| 397,723 | 2/1966 | Switzerland. |

ROBERT L. BLEUTGE, *Primary Examiner.*

U.S. Cl. X.R.

134—99, 154, 155, 159